(12) United States Patent
Cluff et al.

(10) Patent No.: US 11,939,415 B1
(45) Date of Patent: Mar. 26, 2024

(54) POLYSILOXANE-BASED OBJECTS AND 3-DIMENSIONAL PRINTING METHOD FOR MAKING THE SAME

(71) Applicant: Triad National Security, LLC, Los Alamos, NM (US)

(72) Inventors: Kyle Cluff, Los Alamos, NM (US); Matthew Lee, Los Alamos, NM (US); Nicholas Parra-Vasquez, Los Alamos, CA (US); Cassandra Reese, San Diego, CA (US); Matthew Crall, Los Alamos, CA (US)

(73) Assignee: Triad National Security, LLC, Los Alamos, NM (US)

( * ) Notice: Subject to any disclaimer, the term of this patent is extended or adjusted under 35 U.S.C. 154(b) by 513 days.

(21) Appl. No.: 17/169,306

(22) Filed: Feb. 5, 2021

Related U.S. Application Data (60) Provisional application No. 62/971,655, filed on Feb. 7, 2020.

(51) Int. Cl.
| | | |
|---|---|---|
| *C08F 283/12* | (2006.01) | |
| *B29C 64/124* | (2017.01) | |
| *B29C 64/35* | (2017.01) | |
| *B29K 83/00* | (2006.01) | |
| *B33Y 10/00* | (2015.01) | |
| *B33Y 40/20* | (2020.01) | |
| *B33Y 70/00* | (2020.01) | |

(52) U.S. Cl.
CPC .......... *C08F 283/12* (2013.01); *B29C 64/124* (2017.08); *B29C 64/35* (2017.08); *B33Y 10/00* (2014.12); *B33Y 40/20* (2020.01); *B33Y 70/00* (2014.12); *B29K 2083/00* (2013.01)

(58) Field of Classification Search
CPC ..... B29C 64/124; B29C 64/106; B13Y 10/00; C08F 283/12; C08F 283/124; C08F 283/128; B29K 2083/00; B29K 2083/005; B33Y 70/00
See application file for complete search history.

(56) References Cited

U.S. PATENT DOCUMENTS

| | | | |
|---|---|---|---|
| 9,540,494 B2 | 1/2017 | Liu et al. | |
| 2019/0001618 A1* | 1/2019 | Doi | ............ B29C 44/3415 |
| 2021/0332175 A1* | 10/2021 | Matsumoto | ......... C08F 290/068 |

* cited by examiner

*Primary Examiner* — Jeffrey C Mullis
(74) *Attorney, Agent, or Firm* — Klarquist Sparkman LLP (57) ABSTRACT

Disclosed herein are embodiments of an additively manufactured polysiloxane-based object, as well as composition embodiments for making such object embodiments. Also disclosed are embodiments of a method for making the additively manufactured polysiloxane-based object using the composition embodiments described herein. The disclosed composition embodiments and method embodiments provide objects that are substantially free of contaminants that deleteriously affect structural integrity and that comprise a polymer skeleton consisting of oxygen-silicon bonds wherein the silicon component can further comprise one or more branching groups.

19 Claims, 4 Drawing Sheets

POLYSILOXANE-BASED OBJECTS AND 3-DIMENSIONAL PRINTING METHOD FOR MAKING THE SAME

CROSS-REFERENCE TO RELATED APPLICATION

This application claims the benefit of U.S. Provisional Application No. 62/971,655, filed on Feb. 7, 2020, which is incorporated herein by reference in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure concerns embodiments of printed polysiloxane-based objects that are printed using a printable precursor composition and additive manufacturing techniques, as well as embodiments of a method for making the printed polysiloxane-based objects.

BACKGROUND

Currently, methods that exist in the art for 3-dimensional printing silicon-containing components rely on using silicon-containing precursor formulations that further require using a metal catalyst to promote the curing step. This results in amounts of metal (or by-products thereof) that remain in the final product. This metal contamination creates health, safety, and/or regulatory issues and it also negatively affects the long-term stability of the silicon-containing component. Conventional methods for printing silicon-containing components typically require using direct-ink-write printing, which requires very specific precursor formulations, both in terms of chemistry and in terms of aspects like obtaining the proper rheology, viscosity, and cure time. Such methods require formulating new precursor formulations that are specific to each different application. Furthermore, direct-ink-write printers are not readily available and print very slowly. There exists a need in the art for polysiloxane precursor formulations that are suited for different types of additive manufacturing techniques, such as digital light processing (or "DLP"), and that can provide printed product that are free of contaminants, such as metal contaminants, that can deleteriously affect the integrity of the printed product.

SUMMARY

Disclosed herein are embodiments of a printable precursor composition comprising a polymerizable scaffold component and a curable siloxane-containing component that is miscible with the polymerizable scaffold component. In some embodiments, the printable precursor composition is free of, or does not comprise, a metal contaminant and is formulated for use in a printing device.

Also disclosed herein are embodiments of a printed object obtained with the printable precursor composition, wherein the printed object is made of a polysiloxane material provided by the curable siloxane-containing component. In some embodiments, the polysiloxane material comprises a polymer backbone that consists of silicon-oxygen bonds.

Also disclosed are embodiments of a method for using the printable precursor composition, wherein the method comprises providing a printable precursor composition comprising a polymerizable scaffold component and a curable siloxane-containing component; exposing the printable precursor composition to an energy source that provides sufficient energy to polymerize the polymerizable scaffold component thereby providing an intermediate structure comprising a polymerized scaffold and the curable siloxane-containing component; exposing the intermediate structure to conditions sufficient to cure the curable siloxane-containing component to provide a cured polysiloxane-polymerized scaffold hybrid structure comprising a polysiloxane having a polymer backbone that consists of oxygen-silicon bonds; and removing the polymerized scaffold from the cured polysiloxane-polymerized scaffold hybrid structure by exposing the cured polysiloxane-polymerized scaffold hybrid structure to a washing solution. Additional aspects of the method are disclosed herein.

The foregoing and other objects and features of the present disclosure will become more apparent from the following detailed description, which proceeds with reference to the accompanying figures.

DETAILED DESCRIPTION

I. Overview of Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Although the steps of some of the disclosed methods are described in a particular, sequential order for convenient presentation, it should be understood that this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided. Certain functional group terms include a symbol "—" which is used to show how the defined functional group attaches to, or within, the compound to which it is bound. Also, a dashed bond (i.e., "---") as used in certain formulas described herein indicates an optional bond (that is, a bond that may or may not be present). A person of ordinary skill in the art would recognize that the definitions provided below and the compounds and formulas included herein are not intended to include impermissible substitution patterns (e.g., methyl substituted with 5 different groups, and the like). Such impermissible substitution patterns are easily recognized by a person of ordinary skill in the art. In formulas and compounds disclosed herein, a hydrogen atom is present and completes any formal valency requirements (but may not necessarily be illustrated) wherever a functional group or other atom is not illustrated. For example, a phenyl ring that is drawn as comprises a hydrogen atom attached to each carbon atom of the phenyl ring other than the "a" carbon, even though such hydrogen atoms are not illustrated. Any functional group disclosed herein and/or defined above can be substituted or unsubstituted, unless otherwise indicated herein.

Acrylate-Containing: When used in reference to a monomer or oligomer of the present disclosure, this term refers to the fact that the monomer or oligomer comprises at least one carbon-carbon double bond that is bound to a carboxyl group, a carboxylate group, or an ester group.

Acrylamide-Containing: When used in reference to a monomer or oligomer of the present disclosure, this term refers to the fact that the monomer or oligomer comprises at least one carbon-carbon double bond that is bound to an amide group (or an anion thereof).

Acyl Halide: —C(O)X, wherein X is a halogen, such as Br, F, I, or Cl.

Aldehyde: —C(O)H.

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well.

Aliphatic-aromatic: An aromatic group that is or can be coupled to a compound disclosed herein, wherein the aromatic group is or becomes coupled through an aliphatic group.

Aliphatic-aryl: An aryl group that is or can be coupled to a compound disclosed herein, wherein the aryl group is or becomes coupled through an aliphatic group.

Aliphatic-heteroaryl: A heteroaryl group that is or can be coupled to a compound disclosed herein, wherein the heteroaryl group is or becomes coupled through an aliphatic group.

Alkenyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkoxy: —O-aliphatic, such as —O-alkyl, —O-alkenyl, —O-alkynyl; with exemplary embodiments including, but not limited to, methoxy, ethoxy, n-propoxy, isopropoxy, n-butoxy, t-butoxy, sec-butoxy, n-pentoxy (wherein any of the aliphatic components of such groups can comprise no double or triple bonds, or can comprise one or more double and/or triple bonds).

Alkyl: A saturated monovalent hydrocarbon having at least one carbon atom to 50 carbon atoms ($C_{1-50}$), such as one to 25 carbon atoms ($C_{1-25}$), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Amide: —C(O)NR$^a$R$^b$ or —NR$^a$C(O)R$^b$ wherein each of R$^a$ and R$^b$ independently is selected from hydrogen, aliphatic, heteroaliphatic, haloaliphatic, haloheteroaliphatic, aromatic, or an organic functional group.

Amino: —NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Huckel rule (4n+2). The point of attachment to the parent structure typically is through an aromatic portion of the condensed ring system. For example, However, in certain examples, context or express disclosure may indicate that the point of attachment is through a non-aromatic portion of the condensed ring system. For example, An aromatic group or moiety may comprise only carbon atoms in the ring, such as in an aryl group or moiety, or it may comprise one or more ring carbon atoms and one or more ring heteroatoms comprising a lone pair of electrons (e.g. S, O, N, P, or Si), such as in a heteroaryl group or moiety. Aromatic groups may be substituted with one or more groups other than hydrogen, such as aliphatic, heteroaliphatic, haloaliphatic, haloheteroaliphatic, aromatic, or an organic functional group.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, haloaliphatic, haloheteroaliphatic, aromatic, or an organic functional group.

Aroxy: —O—$(CH_2)_n$ aromatic, wherein n is an integer ranging from 0 to 20, such as 0 to 15, or 0 to 10, or 0 to 5.

Azo: —N=NR$^a$ wherein R$^a$ is hydrogen, aliphatic, heteroaliphatic, haloaliphatic, haloheteroaliphatic, aromatic, or an organic functional group.

Carbamate: —OC(O)NR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Carboxyl: —C(O)OH.

Carboxylate: —C(O)O$^-$ or salts thereof, wherein the negative charge of the carboxylate group may be balanced with an M$^+$ counterion, wherein M$^+$ may be an alkali ion, such as K$^+$, Na$^+$, Li$^+$; an ammonium ion, such as +N(R$^b$)$_4$ where R$^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Curable Siloxane-Containing Component: A component of the printable precursor composition embodiments of the present disclosure, the component comprising a silicon-containing oligomer having a structure satisfying Formula I herein, a silicon-based crosslinker having a structure satisfying Formula II or Formula IIA herein, or a combination of the two.

Cured Polysiloxane-Polymerized Scaffold Hybrid Structure: A structure comprising a cured polysiloxane and a polymerized scaffold, wherein these two components are physically associated.

Cured Structure: A polysiloxane-based structure that is a solid. In some embodiments, the cured structure is not a gel or a fluid.

Cyano: —CN.

Disulfide: —SSR$^a$, wherein R$^a$ is selected from hydrogen, aliphatic, heteroaliphatic, haloaliphatic, haloheteroaliphatic, aromatic, or an organic functional group.

Dithiocarboxylic: —C(S)SR$^a$ wherein R$^a$ is selected from hydrogen, aliphatic, heteroaliphatic, haloaliphatic, haloheteroaliphatic, aromatic, or an organic functional group.

Ester: —C(O)OR$^a$ or —OC(O)R$^a$, wherein R$^a$ is selected from aliphatic, heteroaliphatic, haloaliphatic, haloheteroaliphatic, aromatic, or an organic functional group.

Ether: -aliphatic-O-aliphatic, -aliphatic-O-aromatic, -aromatic-O-aliphatic, or -aromatic-0-aromatic.

Halo (or halide or halogen): Fluoro, chloro, bromo, or iodo.

Haloaliphatic: An aliphatic group wherein one or more hydrogen atoms, such as one to 10 hydrogen atoms, independently is replaced with a halogen atom, such as fluoro, bromo, chloro, or iodo.

Haloaliphatic-aryl: An aryl group that is or can be coupled to a compound disclosed herein, wherein the aryl group is or becomes coupled through a haloaliphatic group.

Haloaliphatic-heteroaryl: A heteroaryl group that is or can be coupled to a compound disclosed herein, wherein the heteroaryl group is or becomes coupled through a haloaliphatic group.

Haloalkyl: An alkyl group wherein one or more hydrogen atoms, such as one to 10 hydrogen atoms, independently is replaced with a halogen atom, such as fluoro, bromo, chloro, or iodo. In an independent embodiment, haloalkyl can be a $CX_3$ group, wherein each X independently can be selected from fluoro, bromo, chloro, or iodo.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group. Alkoxy, ether, amino, disulfide, peroxy, and thioether groups are exemplary (but non-limiting) examples of heteroaliphatic. In some embodiments, a fluorophore can also be described herein as a heteroaliphatic group, such as when the heteroaliphatic group is a heterocyclic group.

Heteroaliphatic-aryl: An aryl group that is or can be coupled to a compound disclosed herein, wherein the aryl group is or becomes coupled through a heteroaliphatic group.

Heteroaryl: An aryl group comprising at least one heteroatom to six heteroatoms, such as one to four heteroatoms, which can be selected from, but not limited to oxygen, nitrogen, sulfur, silicon, boron, selenium, phosphorous, and oxidized forms thereof within the ring. Such heteroaryl groups can have a single ring or multiple condensed rings, wherein the condensed rings may or may not be aromatic and/or contain a heteroatom, provided that the point of attachment is through an atom of the aromatic heteroaryl group. Heteroaryl groups may be substituted with one or more groups other than hydrogen, such as aliphatic, heteroaliphatic, haloaliphatic, haloheteroaliphatic, aromatic, or an organic functional group. In some embodiments, a fluorophore can also be described herein as a heteroaryl group.

Heteroatom: An atom other than carbon or hydrogen, such as (but not limited to) oxygen, nitrogen, sulfur, silicon, boron, selenium, or phosphorous. In particular disclosed embodiments, such as when valency constraints do not permit, a heteroatom does not include a halogen atom.

Initiator: A compound that is capable of initiating or promoting the formation of one or more radical species and/or ionic species from a polymerizable scaffold component and/or a curable siloxane-containing component.

Intermediate Structure: A structure comprising a polymerized scaffold component having a particular shape and that is physically associated with a curable siloxane-containing component.

Ketone: —C(O)R$^a$, wherein R$^a$ is selected from aliphatic, heteroaliphatic, haloaliphatic, haloheteroaliphatic, aromatic, or an organic functional group.

Lower Alkyl: An alkyl group having from one to ten carbon atoms.

Metal Contaminant: This term includes any metal (or ion thereof), or any metal complex comprising a metal (or ion thereof). In particular embodiments, a metal contaminant is not present in the polysiloxane-based objects disclosed herein.

Miscible: This term refers to a printable precursor composition wherein the curable siloxane-containing component and the polymerizable scaffold component form a substantially homogeneous mixture when combined.

Monomer: A single compound species that can be polymerized. In some embodiments, the monomer is an acrylate-containing (or acrylamide-containing) monomer or a vinyl group-containing monomer.

Organic Functional Group: A functional group that may be provided by any combination of aliphatic, heteroaliphatic, aromatic, haloaliphatic, and/or haloheteroaliphatic groups, or that may be selected from, but not limited to, aldehyde; aroxy; acyl halide; halogen; nitro; cyano; azide; carboxyl (or carboxylate); amide; ketone; carbonate; imine; azo; carbamate; hydroxyl; thiol; sulfonyl (or sulfonate); oxime; phosphino; ester; thiocyanate; thioketone; thiocarboxylic acid; thioester; dithiocarboxylic acid or ester; phosphonate; phosphate; silyl ether; sulfinyl; thial; or combinations thereof.

Oxime: —CR$^a$=NOH, wherein R$^a$ is hydrogen, aliphatic, heteroaliphatic, haloaliphatic, haloheteroaliphatic, aromatic, or an organic functional group.

Oligomer: A molecule comprising at least two monomers (which can be the same or different) and that can be polymerized. In some embodiments, the monomer is an acrylate-containing (or acrylamide-containing) oligomer or a vinyl group-containing oligomer, or an oligomer comprising a combination thereof. In an independent embodiment, an oligomer is not a polymer and can exhibit altered properties if one of its monomers is removed.

Peroxy: —O—OR$^a$ wherein R$^a$ is hydrogen, aliphatic, heteroaliphatic, haloaliphatic, haloheteroaliphatic, aromatic, or an organic functional group.

Phosphate: —O—P(O)(OR$^a$)$_2$, wherein each R$^a$ independently is hydrogen, aliphatic, heteroaliphatic, haloaliphatic, haloheteroaliphatic, aromatic, or an organic functional group; or wherein one or more R$^a$ groups are not present and the phosphate group therefore has at least one negative charge, which can be balanced by a counterion, M$^+$, wherein each M$^+$ independently can be an alkali ion, such as K$^+$, Na$^+$, Li$^+$; an ammonium ion, such as +N(R$^b$)$_4$ where R$^b$ is H, aliphatic, heteroaliphatic, haloaliphatic, haloheteroaliphatic, or aromatic; or an alkaline earth ion, such as $[Ca^{2+}]_{0.5}$, $[Mg^{2+}]_{0.5}$, or $[Ba^{2+}]_{0.5}$.

Phosphino: —P(R$^a$)$_2$, wherein each R$^a$ independently is hydrogen, aliphatic, heteroaliphatic, haloaliphatic, haloheteroaliphatic, aromatic, or an organic functional group.

Phosphonate: —P(O)(OR$^a$)$_2$, wherein each R$^a$ independently is hydrogen, aliphatic, heteroaliphatic, haloaliphatic, haloheteroaliphatic, aromatic, or an organic functional group; or wherein one or more R$^a$ groups are not present and the phosphate group therefore has at least one negative charge, which can be balanced by a counterion, M$^+$, wherein each M$^+$ independently can be an alkali ion, such as K$^+$, Na$^+$, Li$^+$; an ammonium ion, such as +N(R$^b$)$_4$ where R$^b$ is H, aliphatic, heteroaliphatic, haloaliphatic, haloheteroaliphatic, or aromatic; or an alkaline earth ion, such as [Ca$^{2+}$]$_{0.5}$, [Mg$^{2+}$]$_{0.5}$, or [Ba$^{2+}$]$_{0.5}$.

Polymerizable Scaffold Component: A component of the printable precursor composition embodiments of the present disclosure, the component comprising a monomer or oligomer (or a mixture thereof) capable of being polymerized using a digital light processing method.

Polymerization Quenching Compound: A compound that is capable of preventing or reducing any undesired polymerization of the polymerizable scaffold component and/or the curable siloxane-containing component. In some embodiments, the polymerization quenching compound (i) prevents polymerization from extending beyond a treatment pattern used to print an intermediate structure, such as by preventing radical formation in regions not within the treatment pattern, (ii) prevents polymerization from increasing the thickness of printed layers of the printable precursor composition beyond a desired thickness (e.g., thickness above the height of a printing plane along the z-axis), and/or (iii) scavenges radicals to thereby terminate polymerization. In some embodiments, the polymerization quenching compound can be a radical scavenger or an absorber compound.

Polymerized Scaffold: A solid component comprising a polymerized form of a polymerizable scaffold component.

Porogenic Solvent (or Porogen): A solvent in which a polymerizable scaffold component and/or a curable siloxane-containing component exhibits low solubility such that any resulting polymerized scaffold component and/or any cured polysiloxane is phase-separated from the solvent, thereby forming pores and/or channels within a printed polysiloxane-based object. In particular disclosed embodiments, the degree of solubility of the polymerizable scaffold component and/or a curable siloxane-containing component in the porogenic solvent influences the pore size and structure. For example, the more soluble the polymerizable scaffold component and/or a curable siloxane-containing component is in the porogenic solvent, the smaller the resulting pore sizes will be. Exemplary porogenic solvents include, but are not limited to, dimethylformamide, water, dimethyl sulfoxide (DMSO), alcohols, esters, ketones, glycols, aldehydes, hydrocarbons, weak acids, and weak bases. In an independent embodiment, the porogenic solvent is not acetone, chloroform, or dichloromethane.

Printable Precursor Composition: A composition, comprising a polymerizable scaffold component and a curable siloxane-containing component and that has chemical and/or physical properties (e.g., dispersibility, viscosity, flowability, and the like) sufficient to allow the composition to be printed using a 3-D printer or other stereolithographic process. In an independent embodiment where the curable siloxane-containing component is added to the polymerizable scaffold component after it has been polymerized, the printable precursor composition comprises the polymerizable scaffold component without the curable siloxane-containing component.

Silyl Ether: —OSiR$^a$R$^b$, wherein each of R$^a$ and R$^b$ independently is selected from hydrogen, aliphatic, heteroaliphatic, haloaliphatic, haloheteroaliphatic, aromatic, or an organic functional group.

Sulfinyl: —S(O)R$^a$, wherein R$^a$ is selected from hydrogen, aliphatic, heteroaliphatic, haloaliphatic, haloheteroaliphatic, aromatic, or an organic functional group.

Sulfonyl: —SO$_2$R$^a$, wherein R$^a$ is selected from hydrogen, aliphatic, heteroaliphatic, haloaliphatic, haloheteroaliphatic, aromatic, or an organic functional group.

Sulfonamide: —SO$_2$NR$^a$R$^b$ or —N(R$^a$)SO$_2$R$^b$, wherein each of R$^a$ and R$^b$ independently is selected from hydrogen, aliphatic, heteroaliphatic, haloaliphatic, haloheteroaliphatic, aromatic, or an organic functional group.

Sulfonate: —SO$_3^-$, wherein the negative charge of the sulfonate group may be balanced with an M$^+$ counter ion, wherein M$^+$ may be an alkali ion, such as K$^+$, Na$^+$, Li$^+$; an ammonium ion, such as +N(R$^b$)$_4$ where R$^b$ is H, aliphatic, heteroaliphatic, haloaliphatic, haloheteroaliphatic, or aromatic; or an alkaline earth ion, such as [Ca$^{2+}$]$_{0.5}$, [Mg$^{2+}$]$_{0.5}$, or [Ba$^{2+}$]$_{0.5}$.

Thial: —C(S)H.

Thiocarboxylic acid: —C(O)SH, or —C(S)OH.

Thiocyanate: —S—CN or —N=C=S.

Thioester: —C(O)SR$^a$ or —C(S)OR$^a$ wherein R$^a$ is selected from hydrogen, aliphatic, heteroaliphatic, haloaliphatic, haloheteroaliphatic, aromatic, or an organic functional group.

Thioether: —S-aliphatic or —S-aromatic, such as —S-alkyl, —S-alkenyl, —S-alkynyl, —S-aryl, or —S-heteroaryl; or -aliphatic-S-aliphatic, -aliphatic-S-aromatic, -aromatic-S-aliphatic, or -aromatic-S-aromatic.

Thioketone: —C(S)R$^a$ wherein R$^a$ is selected from hydrogen, aliphatic, heteroaliphatic, haloaliphatic, haloheteroaliphatic, aromatic, or an organic functional group.

Vinyl Group-Containing: When used in reference to a polymerizable scaffold component monomer or oligomer of the present disclosure, this term refers to the fact that the monomer or oligomer comprises at least one carbon-carbon double bond.

II. Introduction

Using printers to print three-dimensional objects has become increasingly popular; however, using 3-D printing techniques to form objects using particular materials/compositions can be difficult due to stability and/or formulation concerns. By way of example, formulations for printing silicon-containing products exist and such formulations can be used to print silicon-containing objects; however, these techniques and formulations typically require using metal catalysts to facilitate polymerization and/or curing. Many such products retain amounts of the metal catalyst (or other forms of the metal of the metal catalyst) within the printed object because it becomes trapped in the material during the manufacturing process. This metal contamination creates problems, not only from the perspective of health, safety, and/or regulation compliance, but it also negatively affects the long-term stability of the printed object. Other methods that are used to print 3-D silicon-containing products rely on materials that provide "pseudo silicone" products comprising silicone oligomers that are polymerized/bound together with other functional groups that negatively affect the stability of the silicon-containing material over time. Because the other functional groups (e.g., epoxides, alkenes, and acrylates) are used to form the chemical bonds that give rise to the polymer backbone, they become part of the polymer backbone structure and thereby introduce other atoms (e.g., carbon atoms) into the backbone, rather than providing "pure" polysiloxane polymer backbones consisting of oxygen-silicon bonds.

The present disclosure concerns new cured polysiloxane-based object embodiments that are substantially free of extraneous components that deleteriously affect the stability of the printed object, such as metal contaminants (e.g., tin catalysts and/or by-products thereof) and/or crosslinking components. Printable precursor composition embodiments for use in making the cured polysiloxane-based objects also are described. And, also disclosed are embodiments of a new method for printing such cured polysiloxane-based objects that avoids having to use conventional crosslinking materials to develop the polymer backbone of the printed object and thus provide objects consisting essentially of, or consisting of, a polymerized form of the original starting material. Conventional crosslinking materials (e.g., epoxide-, acrylic-, or alkene-based crosslinkers) used by others in the field introduce organic functional groups and/or atoms into the polymer backbone such that the backbone does not include an uninterrupted chain of silicon-oxygen bonds. In embodiments where the cured polysiloxane-based object is a cured polysiloxane object, the cured polysiloxane object consists of oxygen-silicon bonds in the polymer backbone (wherein the silicon atoms can be further functionalized with other functional groups by way of branches bound to the silicon atoms of the polymer backbone). The disclosed method embodiments also can be used in combination with digital light processing printers and do not require using direct-ink-write printers, which provides flexibility in the types of resins used in the method, reduces costs associated with the printing process and equipment, reduces processing time, and facilitates scale-up and reproducibility. Digital light processing-based printing polymerizes entire cross sections at a time, rather than having to polymerize one 1-D segment at a time (which requires a toolpath, such as in direct-ink-writing and some other extrusion methods). And, since embodiments of present disclosure can be used with light-based printing methods, the disclosed printable precursor compositions are compatible with emerging light-based techniques for both miniaturization (e.g., micro-stereolithography, 2-photon polymerization techniques, and the like) and scale-up (e.g., holographic techniques, continuous printing, and the like)

III. Printable Precursor Composition and Cured Polysiloxane-Based Embodiments Disclosed herein are embodiments of a printable precursor composition used in method embodiments disclosed herein and cured polysiloxane-based objects made using such printable precursor compositions. The printable precursor composition is a printable fluid that comprises a polymerizable scaffold component and a curable siloxane-containing component and various optional/additional components. The polymerizable scaffold component facilitates printing the curable siloxane-containing component into a desired shape, typically a three-dimensional shape, and helps to retain the desired shape as the curable siloxane-containing component is cured to form the desired printed object. The polymerizable scaffold component can polymerize into a polymerized scaffold during the printing method, which provides an intermediate structure that further comprises the curable siloxane-containing component. This curable siloxane-containing component is the material present in the final object after polymerization, curing, and removal of the polymerized scaffold. In some embodiments, the printable precursor composition can further comprise additional components, such as an initiator, a dye, a polymerization quenching compound, and/or a solvent (including mixtures of two or more of such components).

The polymerizable scaffold component can comprise one or more monomers and/or oligomers that can be polymerized when exposed to an energy source, such as a light source, heat source, or a combination thereof. In some embodiments, the monomers and/or oligomers can be acrylate-containing or acrylamide-containing monomers (and oligomers and/or anhydrides thereof), such as, but not limited to, acrylic acid, methacrylic acid, polyethylene glycol diacrylate [e.g., PEG(600)diacrylate], polyester acrylate, urethane acrylate, epoxy methacrylate, trimethylolpropane ethoxylate triacrylate, N,N-dimethylacrylamide, methacrylic anhydride, and the like, and including any combinations thereof; vinyl group-containing monomers (and oligomers thereof), such as, but not limited to, divinyl benzene, divinyl sulfone, divinyl oxybutane, N-vinylpyrrolidone, succinic acid mono-(2-acryloyloxy-ethyl)ester, vinylsulfonate (e.g., sodium vinylsulfonate), 4-vinyl-benzenesulfonate and the like, and including any combinations thereof; a combination of an acrylate-containing (or acrylamide-containing) monomer and a vinyl group-containing monomer (or a combination of oligomers thereof). In some additional embodiments, the polymerizable scaffold component can comprise a polylactic acid precursor or precursors that provide a thiol-ene polymer. In some embodiments, the polymerizable scaffold component is selected to provide a polymerized scaffold that is sufficiently soluble in a solvent that does not deleteriously affect (e.g., damage or degrade) the cured polysiloxane-based object provided by the curable siloxane-containing component, such that the polymerized scaffold can be washed away from the cured polysiloxane-based object. In some embodiments, the polymerizable scaffold component is a monomer (or an oligomer thereof) that polymerizes to provide a polymer that is soluble in water, alcohol (e.g., ethanol, methanol, isopropanol, or the like) or other solvents, basic solutions (e.g., NaOH), or combinations thereof. The polymerizable scaffold component also can be selected based on its miscibility with the curable siloxane-containing component. For example, in some embodiments, the polymerizable scaffold component is miscible with the curable siloxane-containing component prior to its polymerization when exposed to the energy source. In exemplary embodiments, the polymerizable scaffold component comprises acrylic acid, methacrylic acid, or both.

In some embodiments, the curable siloxane-containing component comprises a polysiloxane precursor (or precursors) that produces a polymerized polysiloxane material making up the printed object. In particular embodiments, a mixture of polysiloxane precursors can be used, including a silicon-containing monomer or oligomer and a silicon-based crosslinker.

In some embodiments, the silicon-containing monomer or oligomer can have a structure satisfying Formula I below.

Formula I

With reference to Formula I, each of $R^1$, $R^2$, $R^3$, and $R^4$ can be the same or different and each $R^3$ and each $R^4$ independently the same or different as any other $R^3$ and $R^4$ groups. In some embodiments, each of $R^1$ and $R^2$ independently can be selected from hydrogen, aliphatic, heteroaliphatic, haloaliphatic, haloheteroaliphatic, aromatic, or an organic functional group provided by any combination of such groups; each $R^3$ independently can be hydrogen, aliphatic, heteroaliphatic, haloaliphatic, haloheteroaliphatic, aromatic, or an organic functional group provided by any combination of such groups; each $R^4$ independently can be hydrogen, aliphatic, heteroaliphatic, haloaliphatic, haloheteroaliphatic, aromatic, or an organic functional group provided by any combination of such groups; and each of m and n independently can be an integer that provides a silicon-containing monomer or oligomer having an average molecular weight of greater than zero to 500,000 g/mol or more, such as 2,000 g/mol to 500,000 g/mol or 2,000 g/mol to 250,000 g/mol, or 2,000 g/mol to 100,000 g/mol, or 2,000 g/mol to 55,000 g/mol; or m and n can be integers that, when taken together, provide a silicon-containing monomer or oligomer having an average molecular weight of greater than zero to 500,000 g/mol or more, such as 2,000 g/mol to 500,000 g/mol or 2,000 g/mol to 250,000 g/mol, or 2,000 g/mol to 100,000 g/mol, or 2,000 g/mol to 55,000 g/mol. In some embodiments, each of m can be an integer selected from 1 to 1,000,000, such as 1 to 750,000 or 1 to 500,000; and n can be an integer selected from 0 to 1,000,000, such as 1 to 750,000 or 1 to 500,000. In particular disclosed embodiments, a silicon-containing oligomer having an average molecular weight of 54,300 g/mol is used. In some embodiments, n and m are selecting using a formula where (n+1) m=6756 (or less).

In some embodiments, each of $R^1$ and $R^2$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In some embodiments, each $R^3$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In some embodiments, each $R^4$ independently can be independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In particular embodiments, each of $R^1$ and $R^2$ independently can be lower alkyl, such as methyl, ethyl, propyl, butyl, pentyl, hexyl, heptyl, octyl, nonyl, or decyl (including straight chain, branched, and cyclic versions thereof); or phenyl. In particular embodiments, each $R^3$ independently can be lower alkyl, such as methyl, ethyl, propyl, butyl, pentyl, hexyl, heptyl, octyl, nonyl, or decyl (including straight chain, branched, and cyclic versions thereof); or phenyl. In particular embodiments, each $R^4$ independently can be lower alkyl, such as methyl, ethyl, propyl, butyl, pentyl, hexyl, heptyl, octyl, nonyl, or decyl (including straight chain, branched, and cyclic versions thereof); or phenyl. In some representative embodiments, each of $R^1$, $R^2$, $R^3$, and $R^4$ (and each instance of $R^3$ and each instance of $R^4$) independently can be methyl or phenyl. In some representative embodiments, the silicon-containing oligomer is polydimethylsiloxane (or PDMS), polydiphenylsiloxane (or PDPS), polydiethylsiloxane (or PDES), poly[dimethylsiloxane-co-(2-(3,4-epoxycyclohexyl)ethyl)methylsiloxane], poly(methylphenylsiloxane), or poly[dimethylsiloxane-co-(3-aminopropyl)methylsiloxane]. In some embodiments, two or more silicon-containing oligomers having structures meeting Formula I can be used.

The silicon-based crosslinker can be a compound having a structure satisfying Formula II below.

Formula II

With reference to Formula II, each X independently can be the same or different and Y can be the same or different as any X. In some embodiments, each X independently can be selected from $OR^5$, wherein each $R^5$ independently is aliphatic, heteroaliphatic, haloaliphatic, haloheteroaliphatic, aromatic, or an organic functional group provided by any combination of such groups; or halogen (such as Cl, Br, F, or I). In some embodiments, Y can be $OR^5$, wherein each $R^5$ independently is aliphatic, heteroaliphatic, haloaliphatic, haloheteroaliphatic, aromatic, or an organic functional group provided by any combination of such groups; $-O-Si(X')_3$, wherein each X' independently is selected from the groups specified for X in Formula II; or hydrogen, aliphatic (e.g., lower alkyl, such as methyl, ethyl, propyl, or butyl), heteroaliphatic, haloaliphatic, haloheteroaliphatic, aromatic, or an organic functional group provided by any combination of such groups. In some embodiments, each X of Formula II is $OR^5$ wherein each $R^5$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In particular embodiments, each $R^5$ independently can be lower alkyl, such as methyl, ethyl, propyl, butyl, pentyl, hexyl, heptyl, octyl, nonyl, or decyl (including straight chain, branched, and cyclic versions thereof). In some representative embodiments, each X is $OR^5$ wherein each $R^5$ independently can be ethyl or propyl.

In particular embodiments, the silicon-based crosslinker can have a structure satisfying Formula IIA.

Formula IIA

With reference to Formula IIA, each of $R^6$, $R^7$, $R^8$, and $R^9$ can be the same or different. In some embodiments, each of $R^6$, $R^7$, $R^8$, and $R^9$ independently can be selected from aliphatic, heteroaliphatic, haloaliphatic, haloheteroaliphatic, aromatic, or an organic functional group provided by any combination of such groups. In some embodiments, each of $R^6$, $R^7$, $R^8$, and $R^9$ independently can be selected from hydrogen, alkyl, alkenyl, alkynyl, heteroalkyl, heteroalkenyl, heteroalkynyl, haloalkyl, haloalkenyl, haloalkynyl, haloheteroalkyl, haloheteroalkenyl, haloheteroalkynyl, aryl, or heteroaryl. In particular embodiments, each of $R^6$, $R^7$, $R^8$, and $R^9$ independently can be lower alkyl, such as methyl, ethyl, propyl, butyl, pentyl, hexyl, heptyl, octyl, nonyl, or decyl (including straight chain, branched, and cyclic versions thereof). In some representative embodiments, each of $R^6$, $R^7$, $R^8$, and $R^9$ independently can be ethyl or propyl. In particular representative embodiments, the silicon-based crosslinker is tetraethyl orthosilicate, tetrapropyl orthosilicate, H—Si(OEt)$_3$, Me-Si(OEt)$_3$, Et-Si(OEt)$_3$, Pr—Si(OEt)$_3$, Bu-Si(OEt)$_3$, or (OEt)$_3$Si—O—Si(OEt)$_3$).

The printable precursor composition can be formulated for use in a printing device, such as a printer device used in additive manufacturing or other three-dimensional printing techniques. In particular embodiments, the printable precursor composition is formulated for use in a digital light processing (DLP) printer. In some embodiments, formulation for use in a printing device comprises modifying the printable precursor composition to have desired viscosity by combining it with a suitable solvent. In some embodiments, formulation for use in a printing device can comprise selecting a particular ratio of the polymerizable scaffold component to the silicon-containing monomer (or oligomer). In some such embodiments, the ratio can be a mass ratio and can range from 0.1 to 2, such as 0.1 to 1.5, or 0.1 to 1, or 0.1 to 0.75, or 0.1 to 0.25 (silicon-containing monomer/oligomer to polymerizable scaffold component). In particular embodiments, the mass ratio can be 0.1, 0.25, 0.75, 1, 1.5, or 2 (silicon-containing monomer/oligomer to polymerizable scaffold component). In some embodiments, the curable siloxane-containing component is present in an amount ranging from 10 wt % to 90 wt %, such as 20 wt % to 80 wt %, or 30 wt % to 70 wt %. In some embodiments, the amount of the silicon-based crosslinker that can be used can range from an amount that provides a molar ratio of 2:1 to 1:2 (or higher) of the silicon-containing monomer/oligomer to the silicon-based crosslinker. In particular embodiments, an excess of silicon-based crosslinker is used (relative to the amount of the silicon-based monomer/oligomer). In some embodiments, the silicon-based crosslinker is provided in an amount that is 1% of the total resin volume and/or from 1.7% to 13% (or higher) of the silicon-containing monomer/oligomer) volume. In exemplary embodiments, 650 μL of the silicon-based crosslinker is used for every 62 mL of the total composition volume. In some additional embodiments, formulation for use in a printing device can comprise adding one or more of the additional components described herein to the printable precursor composition, such as an initiator, a dye, a polymerization quenching compound, and/or a solvent.

As discussed herein, the printable precursor composition can also comprise, or can be used in combination with an initiator, a dye, a polymerization quenching compound, and/or a solvent. In such embodiments, the initiator is a compound that is capable of promoting polymerization of the printable precursor composition, such as by inducing ionic polymerization and/or radical polymerization of the polymerizable scaffold component and/or the curable siloxane-containing component. In some embodiments, the initiator component can comprise a cationic radical initiator (e.g., an onium salt, such as an iodonium salt, a sulfonium salt, or a combination thereof; an organometallic complex, such as a ferrocinium salt, or a pyridinium salt; or a combination thereof), or a free radical initiator (e.g., a benzophenone, a xanthanone, a quinone, a benzoin ether, an acetophenone, a benzoyl oxime, an acylphosphine, or a combination thereof). In particular disclosed embodiments, the initiator component can be selected from phenylbis(2,4,6-trimethylbenzoyl)phosphineoxide, 2-hydroxy-4'-(2-hydroxyethoxy)-2-methylpropiophenone, 2-hydroxy-2-methylpropiophenone, 2-methyl-4'-(methylthio)-2-morpholinopropiophenone, [4-[(2-Hydroxytetradecyl)oxy]phenyl]phenyliodonium hexafluoroantimoniate, or the like and including any combinations thereof. In some embodiments, the initiator is present in an amount ranging from 0.01 wt % to 5 wt % of the printable precursor resin, such as 0.01 wt % to 2.5 wt %. In particular embodiments, the initiator compound does not become part of the polysiloxane-based object. As such, in such embodiments, the polysiloxane-based object is free of, or does not comprise, the initiator compound.

The polymerization quenching compound can be selected from a compound that is capable of preventing or reducing any undesired polymerization of the printable precursor composition (or a component thereof). For example, undesired polymerization can be controlled such that polymerization does not extend beyond the treatment pattern being used to print the polysiloxane product and/or such that the thickness of printed layers of the printable precursor composition is controlled to be a particular desired thickness). In some embodiments, the polymerization quenching compound can be selected from a radical scavenger or an absorber, such as an azo-containing compound (e.g., an azo dye), or a compound capable of terminating ionic polymerization. In some embodiments when the polymerization quenching compound is a dye, the dye can compete for absorption of the incident light, preventing the formation of free radicals in areas where polymerization is not desired. In some embodiments, the polymerization quenching compound can be a dye, such as an azo-containing dye like a SUDAN® dye (e.g., SUDAN® I, SUDAN® II, SUDAN® III, etc.) or other visible- or UV-absorbing dye such as Oracet Yellow, Orasol Orange, (2,2,6,6-tetramethylpiperidin-1-yl)oxyl (or TEMPO), and the like. In some embodiments, the polymerization quenching compound can be present in an amount ranging from 0.001 wt % to 0.75 wt % of the printable precursor composition. In some embodiments, a mixture of two polymerization quenching compounds can be used, such as a combination of a dye and TEMPO, wherein the dye is present at a range of 0.001 wt % to 0.75 wt % of the printable precursor composition and TEMPO is present at a range of 0.0001 wt % to 1 wt % (such as 0.001 wt % to 0.25 wt %, or 0.0001 wt % to 0.1 wt %). In particular embodiments, the polymerization quenching compound does not become part of the polysiloxane-based object. As such, in such embodiments, the polysiloxane-based object is free of, or does not comprise, the polymerization quenching compound.

The solvent can be any solvent suitable for additive manufacturing. In some embodiments, the solvent can be selected to provide a desired density of the printable precursor composition, or a component thereof (e.g., the polymerizable scaffold component or the curable siloxane-containing component). For example, the type of solvent or the concentration of solvent can be modified to provide a printable precursor composition that is more or less viscous relative to the printable precursor composition without the solvent. In some embodiments, the solvent can be selected to provide a desired porosity within a printed object. For example, a porogenic solvent can be used to tune the porosity of a printed object. Exemplary porogenic solvents can include, but are not limited to, dimethylformamide (DMF), dimethyl sulfoxide (DMSO), water, an alcohol (such as ethanol, pentanol, hexanol, isopropanol, or alcohols with longer carbon chains, such as decanol and the like), a hydrocarbon (such as undecane, dodecane, mineral oil, toluene, and the like), an acid, a base (such as boric acid and the like), or any combinations thereof. In particular embodiments, the acid and/or base is a weak acid and/or weak base such that the acid and/or base is not so concentrated that it deleteriously interferes with a printing process and/or chemically degrades components of the printable precursor composition. Solely by way of example, concentrated acids, such as concentrated nitric or sulfuric acid, are typically not considered weak acids unless they have been diluted to a lower concentration (e.g., lower than 10 M, such as 8 M or lower, 4 M or lower, 2 M or lower, or less than 1 M. In yet additional embodiments, the solvent can be selected to promote phase separation of the polymerizable scaffold component and the curable siloxane-containing component during the printing process. In some such embodiments, a co-continuous arrangement of phases of the polymerizable scaffold component and the curable siloxane-containing component is provided so that the siloxane component can crosslink into a continuous phase when being cured and the polymerized scaffold can be removed.

After the printable precursor composition is exposed to method steps described herein, a cured polysiloxane-based object is obtained. The cured polysiloxane-based object typically comprises the cured polysiloxane formed from the curable siloxane-containing component and is substantially free of the polymerized scaffold. In some embodiments, the cured polysiloxane-based object can comprise a trace amount of the polymerized scaffold. In embodiments where the cured polysiloxane-based object is made of a cured polysiloxane material, the cured polysiloxane material comprises a polymer backbone that consists of silicon-oxygen bonds and is free of any silicon-carbon bonds. In such embodiments, the fact that the polymer backbone is free of any silicon-carbon bonds is not intended to encompass the silicon-carbon bonds that may exist between the polymer backbone and branches of the polymer backbone. That is, aliphatic branches that may extend from silicon atoms of the cured polysiloxane material are not intended to be part of the polymer backbone. In independent embodiments, the cured polysiloxane-based object is free of, or does not comprise, a metal contaminant. In some embodiments, the cured polysiloxane-based object can have a structure satisfying Formula III, below.

Formula III

With reference to Formula III, each of $R^1$, $R^2$, $R^3$, $R^4$, n, and m can be as recited above for Formula I; each n' independently can be selected from an integer provided for variable n in Formula I; each m' independently can be selected from an integer provided for variable m in Formula I; and p independently can be an integer selected from 1 to 500,000 or higher. Also with reference to Formula III, each wavy line independently indicates a disconnection between the illustrated oxygen atom and either a group selected from $R^6$, $R^7$, $R^8$, and $R^9$ and a silicon atom of another silicon-containing monomer or oligomer satisfying Formula I, a silicon-based crosslinker satisfying Formula II (or Formula IIA), and/or an additional component having a structure satisfying Formula III.

IV. Method Embodiments

Figure 1:
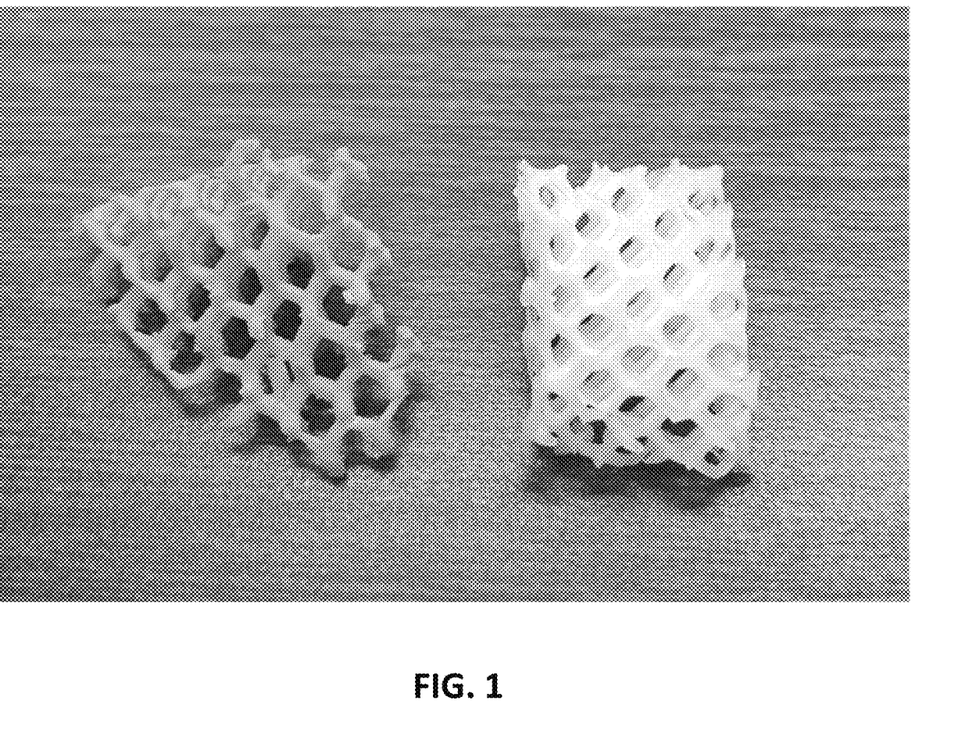
FIG. 1 is a photographic image of an as-printed, polymethacrylic acid (PMAA)/polydimethylsiloxane (PDMS) cured polysiloxane-polymerized scaffold hybrid structure (left) and the resulting PDMS-based object obtained after removing the polymerized PMAA scaffold (right).
Figure 2:
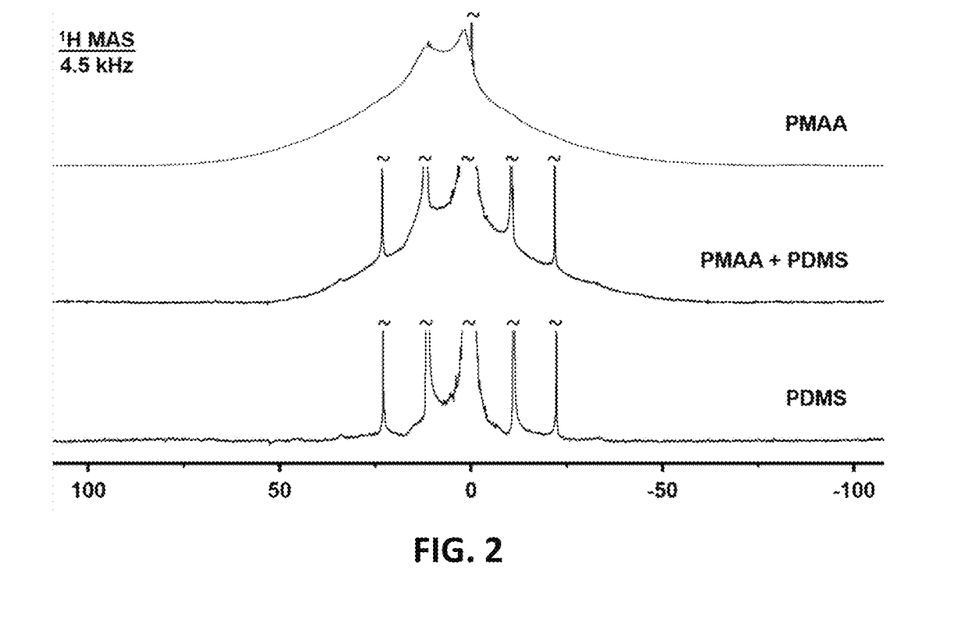
FIG. 2 is a solid-state nuclear magnetic resonance spectrum (NMR) showing the spectra obtained for (i) a cured polysiloxane-polymerized scaffold hybrid structure before being washed to remove the polymerized PMAA scaffold (middle); and (ii) after washing to provide the pure polysiloxane-based object (bottom); a spectrum for PMAA also is provided for comparison (top).
Figure 3:
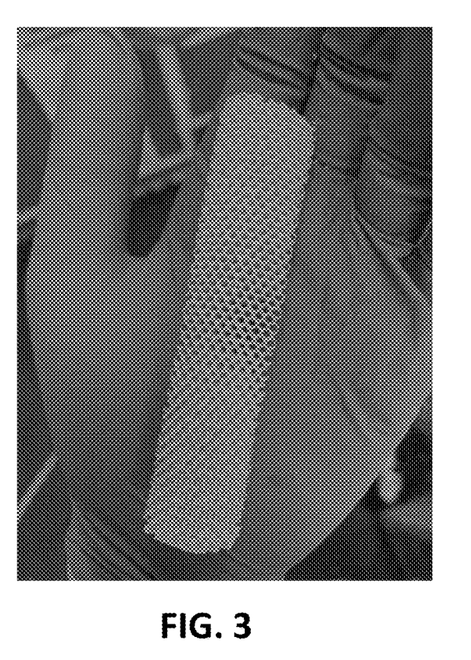
FIG. 3 is a photographic image of an as-printed cured polysiloxane-polymerized scaffold hybrid structure prior to washing the structure to remove the polymerized scaffold.
Figure 4:
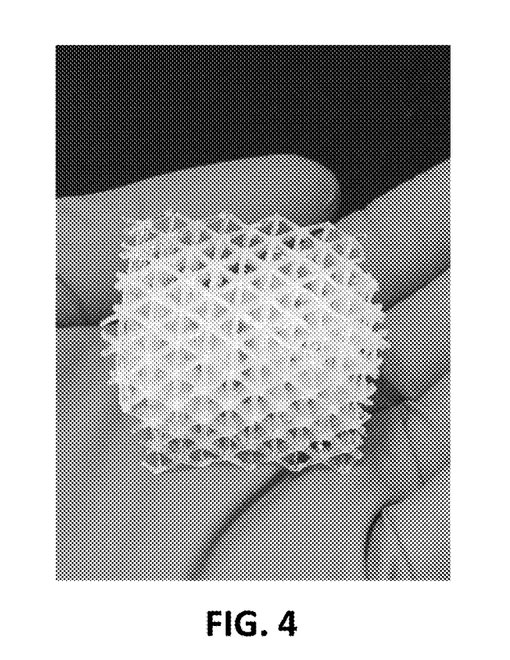
FIG. 4 is a photographic image of a polysiloxane-based object after washing and removal of the polymerized scaffold.
Figure 5:
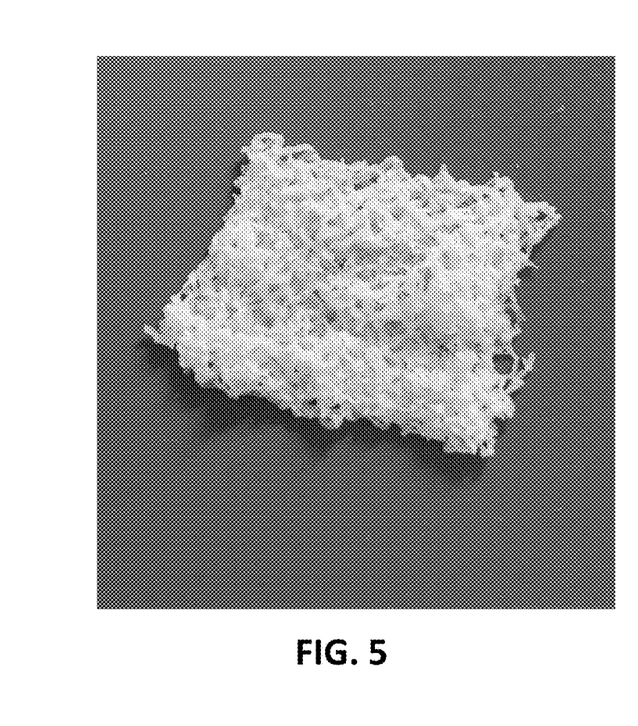
FIG. 5 is an image of a comparative printed polysiloxane-based object that was obtained using a precursor solution embodiment wherein phase separation of the polymerizable scaffold component and the curable siloxane-containing component was not achieved, resulting in a continuous phase of the polymerizable scaffold component and a discontinuous phase of the curable siloxane-containing component, which was unable to maintain a desired structure after removing the polymerized scaffold.
Figure 6:
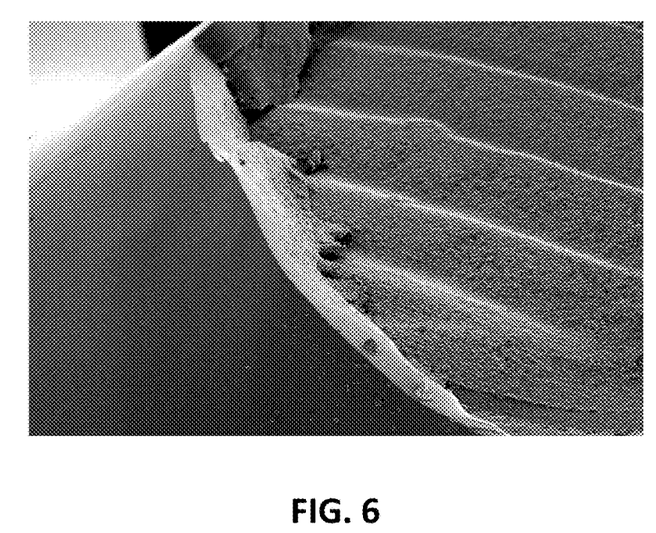
FIG. 6 is an image obtained by using scanning electron microscopy (SEM) to analyze a cross-section of a printed polysiloxane-based object made using a printable precursor composition and method embodiment described herein; as can be seen in the SEM image, the outside of the printed polysiloxane-based object is smooth and the interior is porous.

Also disclosed herein are embodiments of a method for making the printed objects of the present disclosure. In some embodiments, the method comprises providing a printable precursor composition, exposing the printable precursor composition comprising a polymerizable scaffold component and a curable siloxane-containing component to an energy source for a time sufficient to facilitate polymerization of the polymerizable scaffold component. This step can provide an intermediate structure comprising a polymerized scaffold and the curable siloxane-containing component. The method further comprises exposing the intermediate structure to conditions sufficient to cure the curable siloxane-containing component to provide a cured polysiloxane-polymerized scaffold hybrid structure. The polymerized scaffold is then removed from the cured polysiloxane-polymerized scaffold hybrid structure by exposing the cured polysiloxane-polymerized scaffold hybrid structure to a washing solvent. Features of the method are described in more detail below. An exemplary cured polysiloxane-polymerized scaffold hybrid structure and a cured polysiloxane-based object are illustrated in FIG. 1 (the cured polysiloxane-polymerized scaffold hybrid structure is shown on the left and the corresponding cured polysiloxane-based object is shown on the right). Additional embodiments are illustrated in FIG. 3 (showing another cured polysiloxane-polymerized scaffold hybrid structure) and FIG. 4 (showing a cured polysiloxane-based object). FIG. 5 shows a polysiloxane-based object that results when phase separation of the polymerizable scaffold component and the curable siloxane-containing component fails to produce two continuous phases and instead provided a continuous phase of the polymerizable scaffold component and a discontinuous phase of the curable siloxane-containing component. As can be seen in FIG. 5, this embodiment was unable to maintain a desired structure after removing the polymerized scaffold. In particular embodiments, it is desirable for the polymerizable scaffold component and the curable siloxane-containing component to phase separate during printing, such that two distinct, yet interwoven phases are formed. In some such embodiments, both phases are "continuous," meaning that there are no discontinuous regions wherein either component is surrounded by the other component. That is, in some such embodiments, both phases are fully contiguous and connected to themselves. These continuous phases can facilitate a structurally intact cured polysiloxane product and can promote full dissolution of the polymerized scaffold. FIG. 6 is an SEM image of a region of a polysiloxane-based object made according to a disclosed method embodiment.

In particular embodiments, at least certain steps of the method are carried out in a system that utilizes a fluid-fluid interface that facilitates printing the intermediate structure without the layers or other portion of the intermediate structure coming into contact with a surface of the container housing the printable precursor composition. In particular embodiments, the system comprises a combination of the printable precursor composition and a second fluid that forms the fluid-fluid interface. The system can further comprise a container that houses these components. In some embodiments, the system can be combined with a stepper motor, a printing platform, an energy source capable of inducing polymerization of the polymerizable scaffold component, an enclosure, or other components suitable for additive manufacturing methods.

The second fluid of the system is a fluid that has properties sufficient to prevent it from substantially mixing with the printable precursor composition in a manner that allows the printable precursor composition to adhere to a printing surface of the container component of the system during the printing process. In particular disclosed embodiments, the second fluid also is substantially transparent such that light from the energy source is able to reach the printable precursor composition so that it can facilitate polymerization of the polymerizable scaffold component. In some embodiments, the second fluid has a density different from that of the printable precursor composition so that printing occurs at the fluid-fluid interface rather than directly on a surface of the container.

Representative examples of the second fluid can include, but are not limited to, organic solvents, aqueous solutions (e.g., water or water-based solutions), or combinations thereof. Suitable organic solvents include, but are not limited to, chlorinated solvents (e.g., chloroform, dichloromethane, carbon tetrachloride, chlorobenzene, 1,2-dichloroethane, and the like), perfluorinated solvents (e.g., perfluorohexane, perfluoro(2-butyl-tetrahydrofurane), perfluoropentylamine, perfluorotributylamine, and other perfluorinated solvents), ionic solvents, silicone oils, or combinations thereof. In particular disclosed embodiments, a perfluorinated solvent, such as those sold under the tradename FLUORINERT®, by 3M, can be used, including, but not limited to, perfluorinated solvents like FC-3284 (having an average molecular weight of 299 g/mol), FC-72 (having an average molecular weight of 338 g/mol), FC-770 (having an average molecular weight of 399 g/mol), FC-3283 (having an average molecular weight of 521 g/mol), FC-40 (having an average molecular weight of 650 g/mol), FC-43 (having an average molecular weight of 670 g/mol), FC-70 (having an average molecular weight of 820 g/mol), or combinations thereof. Representative organic solvents can include, but are not limited to, benzene, toluene, tetrahydrofuran, dimethylformamide, acetonitrile, water, methanol, ethanol, ionic liquids, silicone oils, aliphatic solvents (e.g., solvents comprising linear and/or cycloalkanes), and the like.

The method can further comprise moving, in a vertical direction, a stepper motor that is mechanically coupled to a printing platform. The stepper motor and/or the printing platform typically are positioned within the container of the fluid-fluid interface system and immersed in the printable precursor composition. As the stepper motor is moved in a vertical direction (e.g., up and/or down), polymerization of the polymerizable scaffold component takes place in locations where light from the energy source is focused and an object is formed, either by printing individual layers of printable precursor composition on one another or in a continuous process. Any number of layers can be printed by repeating the process of moving the stepper motor and/or the printing platform up and down and exposing the printable precursor composition to light.

After the intermediate structure is formed, it is exposed to conditions sufficient to cure the curable siloxane-containing component to provide a cured polysiloxane-polymerized scaffold hybrid structure. In some embodiments, these conditions comprise exposing the intermediate structure to a temperature ranging from ambient temperature (or lower temperatures) to 200° C. (or higher), such as 25° C. to 200° C., or 30° C. to 150° C., or 40° C. to 100° C., or 50° C. to 70° C., or, in some embodiments, 60° C. to 200° C. The intermediate structure can be exposed to such temperatures for any amount of time sufficient to allow the curable siloxane-containing component to fully cure. In some embodiments, the intermediate structure can be exposed to such temperatures for 1 hour to 96 hours (or longer), such as 1 hour to 72 hours, or 1 hour to 48 hours, or 1 hour to 24 hours. In some embodiments, the amount of the silicon-based crosslinker can be increased to promote faster curing of the curable siloxane-containing component. In some embodiments, the curable siloxane-containing component can be cured by placing the intermediate structure in an enclosed space and filling the enclosed space with a vapor selected to catalyze the curing process. In some embodiments, the vapor can be produced from HCl, ammonia, or the like. In representative embodiments, the conditions used to cure the curable siloxane-containing component can comprise heating the intermediate structure at a temperature of 75° C. for 4 to 12 hours.

Figure 7A:
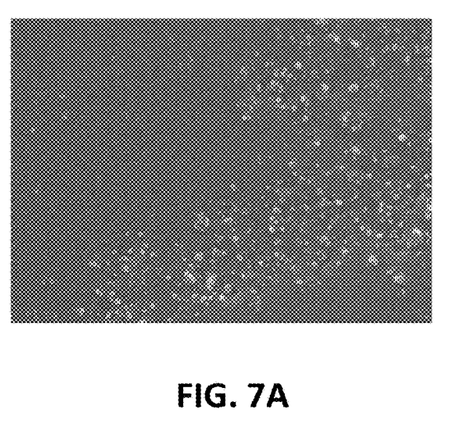
FIGS. 7A and 7B show SEM images of a cured polysiloxane-polymerized scaffold hybrid structure before a processing step to remove polymethacrylic acid (PMAA) (FIG. 7A) and after removing the PMAA to provide the printed polysiloxane-based object (FIG. 7B); as can be seen in FIG. 7B, pores are obtained after removing the PMAA.
Figure 7B:
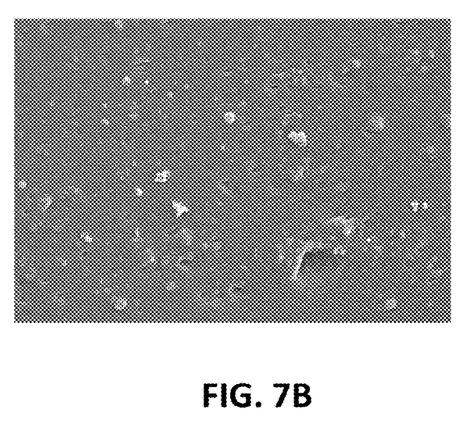

The method can further comprise removing the polymerized scaffold from the cured polysiloxane-polymerized scaffold hybrid structure by exposing the cured polysiloxane-polymerized scaffold hybrid structure to a washing solution. The washing solution comprises one or more liquids that can dissolve the polymerized scaffold component from the cured polysiloxane-polymerized scaffold hybrid structure without dissolving the cured polysiloxane. In particular embodiments, the washing solution can be water, an alcohol (e.g., methanol, ethanol, isopropanol, butanol, or the like), or a combination thereof. In some embodiments, the washing solution comprises water, ethanol, or a combination of water and ethanol. In some embodiments, exposing the cured polysiloxane-polymerized scaffold hybrid structure to the washing solution can comprise immersing the cured polysiloxane-polymerized scaffold hybrid structure in the washing solution. The cured polysiloxane-polymerized scaffold hybrid structure can be immersed in the washing solution for a time period sufficient to fully dissolve the polymerized scaffold component such that none remains associated with the cured polysiloxane. In some embodiments, NMR can be used to evaluate whether any polymerized scaffold component remains associated with the cured polysiloxane. In some independent embodiments, trace amounts of the polymerized scaffold component can remain in the final product without deleteriously effecting the integrity of the final product. In such embodiments, the trace amount can range from 0.1 wt % to 5 wt % or less, such as 0.1 wt % to 0.4 wt %, or 0.1 wt % to 0.3 wt %, or 0.1 wt % to 0.2 wt %. In particular embodiments, the exposing step can further comprise heating and/or irradiating the washing solution containing the immersed cured polysiloxane-polymerized scaffold hybrid structure. In such embodiments, heating can comprise exposing the washing solution containing the cured polysiloxane-polymerized scaffold hybrid structure to temperature ranging from 20° C. to 100° C., such as 45° C. to 75° C. Irradiating the washing solution containing the cured polysiloxane-polymerized scaffold hybrid structure can comprise exposing it to UV light. In yet some additional embodiments, the method can further comprise adding a hydroxide compound, or a solution thereof, to the washing solution. In some embodiments, the hydroxide component is added after the bulk of the polymerized scaffold component has been removed and can facilitate removing residual polymerized scaffold component that might be present in various regions and/or pores of the cured polysiloxane-based object. FIGS. 7A and 7B show images of an exemplary embodiment before and after processing, wherein pores are seen (FIG. 7B) after removing a polymerized scaffold component from the polysiloxane-polymerized scaffold hybrid structure (FIG. 7A). In particular embodiments, the hydroxide component is ammonium hydroxide. Any combination of these washing steps can be used and can be repeated any number of times until the polymerized scaffold component is removed from the cured polysiloxane-polymerized scaffold hybrid structure to provide the final product comprising the cured polysiloxane. In a representative embodiment, a washing solution comprising ethanol is used to remove the polymerized scaffold component in combination with UV light for 8 to 12 hours.

In some independent embodiments, the method can comprise first forming a scaffold structure by using a printable precursor composition comprising the polymerizable scaffold component but that is free of the curable siloxane-containing component. A desired structure can be printed using the polymerizable scaffold component and polymerizing during the printing method using the fluid-fluid interface system described herein. Once the scaffold structure is printed, it can be coated with a composition comprising the curable siloxane-containing component. The coated intermediate product can then be exposed to the curing and washing steps described above to provide the final polymer product from which the polymerized scaffold component has been removed.

V. Overview of Several Embodiments

Disclosed herein are embodiments of a printable precursor composition, comprising: a polymerizable scaffold component; and a curable siloxane-containing component that is miscible with the polymerizable scaffold component. In some embodiments, the printable precursor composition is free of, or does not comprise, a metal contaminant.

In any or all of the above embodiments, the printable composition is formulated for use in a printing device.

In any or all of the above embodiments, the polymerizable scaffold component comprises a monomer, an oligomer, or both.

any or all of the above embodiments, the polymerizable scaffold component comprises an acrylate-containing monomer, an acrylate-containing oligomer, or both.

In any or all of the above embodiments, the polymerizable scaffold component comprises acrylic acid, methacrylic acid, or a combination thereof.

In any or all of the above embodiments, the curable siloxane-containing component comprises: a silicon-containing monomer or oligomer having a structure satisfying Formula I Formula I wherein each of $R^1$ and $R^2$ independently is selected from hydrogen, aliphatic, heteroaliphatic, haloaliphatic, haloheteroaliphatic, aromatic, or an organic functional group provided by any combination of such groups; each $R^3$ independently is hydrogen, aliphatic, heteroaliphatic, haloaliphatic, haloheteroaliphatic, aromatic, or an organic functional group provided by any combination of such groups; each $R^4$ independently is hydrogen, aliphatic, heteroaliphatic, haloaliphatic, haloheteroaliphatic, aromatic, or an organic functional group provided by any combination of such groups; n can be an integer selected from 0 to 1,000,000; m is an integer selected from 1 to 1,000,000; and a silicon-based crosslinker having a structure satisfying Formula II Formula II wherein each X independently is halogen or $OR^5$, wherein each $R^5$ independently is aliphatic, heteroaliphatic, haloaliphatic, haloheteroaliphatic, aromatic, or an organic functional group provided by any combination of such groups; and Y is $OR^5$, wherein each $R^5$ independently is aliphatic, heteroaliphatic, haloaliphatic, haloheteroaliphatic, aromatic, or an organic functional group provided by any combination of such groups; —O—Si(X')$_3$, wherein each X' independently is halogen or $OR^5$, wherein each $R^5$ independently is aliphatic, heteroaliphatic, haloaliphatic, haloheteroaliphatic, aromatic, or an organic functional group provided by any combination of such groups; or hydrogen, aliphatic, heteroaliphatic, haloaliphatic, haloheteroaliphatic, aromatic, or an organic functional group provided by any combination of such groups.

In any or all of the above embodiments, the silicon-based crosslinker has a formula satisfying Formula IIA, Formula IIA wherein each of $R^6$, $R^7$, $R^8$, and $R^9$ independently is selected from aliphatic, heteroaliphatic, haloaliphatic, haloheteroaliphatic, aromatic, or an organic functional group provided by any combination of such groups.

In some embodiments, each of $R^1$, $R^2$, $R^3$, $R^4$, $R^6$, $R^7$, $R^8$, and $R^9$ independently is lower alkyl or phenyl.

In some embodiments, each of $R^1$, $R^2$, $R^3$, $R^4$, $R^6$, $R^7$, $R^8$, and $R^9$ independently is methyl, ethyl, or phenyl.

In any or all of the above embodiments, each of $R^1$, $R^2$, $R^3$, and $R^4$ independently is methyl and each of $R^6$, $R^7$, $R^8$, and $R^9$ independently is ethyl.

In any or all of the above embodiments, each of $R^1$, $R^2$, $R^3$, and $R^4$ independently is ethyl or phenyl and each of $R^6$, $R^7$, $R^8$, and $R^9$ independently is methyl.

In any or all of the above embodiments, the curable siloxane-containing component comprises polydimethylsiloxane, polydiethylsiloxane, polydiphenylsiloxane, or a combination thereof; and tetraethyl orthosilicate, tetrapropyl orthosilicate, or both.

In any or all of the above embodiments, the printable precursor composition further comprises an initiator, a dye, a polymerization quenching compound, a solvent, or any combination thereof.

In any or all of the above embodiments, the printable precursor composition comprises acrylic acid, methacrylic acid, or a combination thereof; polydimethylsiloxane, polydiethylsiloxane, polydiphenylsiloxane, or a combination thereof; tetraethyl orthosilicate, tetrapropyl orthosilicate or both; an initiator; and a dye.

Also disclosed herein are embodiments of a printed object formed from the printable precursor composition according to any one or more of the above embodiments, wherein the printed object is formed by additive manufacturing using a digital light processing printing device and the printed object comprises a cured structure having a polymeric backbone consisting of silicon-oxygen bonds formed from the curable siloxane-containing component.

In some embodiments, the cured structure consists of polydimethylsiloxane.

Also disclosed are embodiments of a method comprising: providing a printable precursor composition comprising a polymerizable scaffold component and a curable siloxane-containing component; exposing the printable precursor composition to an energy source that provides sufficient energy to polymerize the polymerizable scaffold component thereby providing an intermediate structure comprising a polymerized scaffold and the curable siloxane-containing component; exposing the intermediate structure to conditions sufficient to cure the curable siloxane-containing component to provide a cured polysiloxane-polymerized scaffold hybrid structure comprising a polysiloxane having a polymer backbone that consists of oxygen-silicon bonds; and removing the polymerized scaffold from the cured polysiloxane-polymerized scaffold hybrid structure by exposing the cured polysiloxane-polymerized scaffold hybrid structure to a washing solution.

In some embodiments, removing the polymerized further comprises exposing the cured polysiloxane-polymerized scaffold hybrid structure and the washing solution to heat, irradiation, a hydroxide component, or a combination thereof.

In any or all of the above embodiments, exposing the intermediate structure to conditions sufficient to cure the curable siloxane-containing component comprises heating the intermediate structure.

In any or all of the above embodiments, the method is performed using a digital light processing printer.

In any or all of the above embodiments, the washing solution comprises water, an alcohol, or a combination thereof.

In any or all of the above embodiments, the printable precursor composition is free of, or does not comprise, a metal contaminant.

In some embodiments, the method comprises: adding a printable precursor composition comprising (i) methacrylic acid or acrylic acid and (ii) a solution comprising polydimethylsiloxane, polydiphenylsiloxane, or both; and tetraethyl orthosilicate, tetrapropyl orthosilicate, or both to a digital light processing printer; polymerizing the methacrylic acid or the acrylic acid using the digital light processing printer to provide an intermediate structure comprising a polymerized scaffold comprising polymetharylic acid or polyacrylic acid in physical association with the solution comprising the polydimethylsiloxane, the polydiphenylsiloxane, or both; and the tetraethyl orthosilicate, the tetrapropyl orthosilicate, or both; exposing the intermediate structure to a temperature ranging from ambient temperature to 100° C. to cure the polydimethylsiloxane, the polydiphenylsiloxane, or both; and the tetraethyl orthosilicate, the tetrapropyl orthosilicate, or both to provide a cured polysiloxane-polymerized scaffold hybrid structure comprising a polysiloxane having a polymer backbone that consists of oxygen-silicon bonds; and removing the polymerized scaffold from the cured polysiloxane-polymerized scaffold hybrid structure by exposing the cured polysiloxane-polymerized scaffold hybrid structure to a washing solution.

VI. EXAMPLES

Example 1

In this example, a printable precursor composition was made wherein a combination of a high average molecular weight silicone resin (54,300 g/mol in this example) and tetrapropyl orthosilicate was used to provide the curable siloxane-containing component and methacrylic acid was used as the polymerizable scaffold component. Specifically, the printable precursor composition comprised 24 g of the high average molecular weight silicone resin, 32 ml of the methacrylic acid, 520 µL of the tetrapropyl orthosilicate, 800 mg of Irgacure 819, and 200 µL of a Sudan 1 dye solution (comprising 1.8 mg Sudan 1 per 30 microliters of DMF).

Example 2

In this example, a printable precursor composition was made wherein a combination of a high average molecular weight silicone resin (54,300 g/mol in this example) and tetrapropyl orthosilicate was used to provide the curable siloxane-containing component and methacrylic acid was used as the polymerizable scaffold component. The tetrapropyl orthosilicate was used in an amount that was half the amount used in Example 1. Specifically, the printable precursor composition comprised 24 g of the high average molecular weight silicone resin, 40 ml of the methacrylic acid, 260 µL of the tetrapropyl orthosilicate, 800 mg of Irgacure, and 200 µL of a Sudan 1 dye solution.

Example 3

In this example, a printable precursor composition was made wherein a combination of a high average molecular weight silicone resin (54,300 g/mol in this example), a low average molecular weight silicon resin (2,350 g/mol in this example), and tetrapropyl orthosilicate was used to provide the curable siloxane-containing component and methacrylic acid was used as the polymerizable scaffold component. Specifically, the printable precursor composition comprised 12 g of the high molecular average weight silicone resin, 12 g of the low average molecular weight silicone resin, 40 ml of the methacrylic acid, 780 µL of the tetrapropyl orthosilicate, 800 mg of Irgacure, and 200 µL of a Sudan 1 dye solution.

Example 4

In this example, a printable precursor composition was made wherein a combination of a high average molecular weight silicone resin (54,300 g/mol in this example), a low average molecular weight silicon resin (2,350 g/mol in this example), and tetrapropyl orthosilicate was used to provide the curable siloxane-containing component and acrylic acid was used as the polymerizable scaffold component. Specifically, the printable precursor composition comprised 12 g of the high average molecular weight silicone resin, 12 g of the low average molecular weight silicone resin, 40 ml of the acrylic acid, 780 µL of the tetrapropyl orthosilicate, 400 mg of Irgacure, and 200 µL of a Sudan 1 dye solution.

Example 5

In this example, each of the printable precursor compositions of Examples 1-4 were used to print a silicone printed product using the parameters described below. A fluid-fluid interface system was used, wherein a printing vat having a 9 cm diameter was used and which contained a 3-8 mm deep layer of Fluorinert at the bottom the printing vat along with a flow of Fluorinert FC-70 introduced into the printing vat at a rate of 50 mL/min. In some examples, the Fluorinert FC-70 can be circulated between the vat and a deoxygenation apparatus.

Printing Parameters:

Exposure time to energy source=30 seconds per layer

Layer thickness=100 microns 0-3 second delay between layers to allow components to settle 2 mm lift between layers to allow resin to fully coat the bottom In some embodiments, the light intensity can be used at a maximum light intensity that can be produced by the energy source (e.g., a projector), or can be reduced to 25-75% of the maximum intensity. After printing, the printed part is soaked in ethanol for 6-12 hours while heating at 60° C. and exposing the part to UV light.

Example 6

Figure 8A:
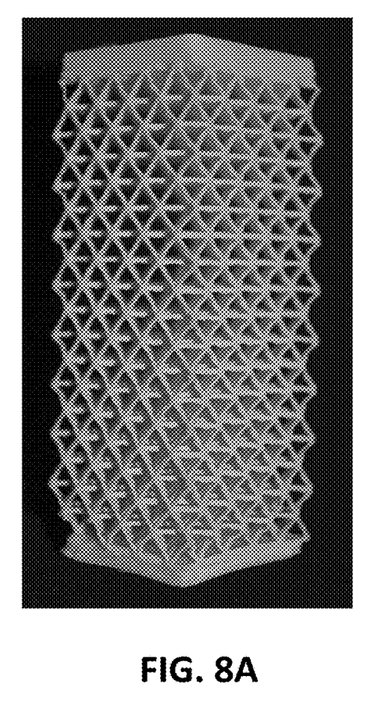
FIGS. 8A and 8B are photographic images of a cured polysiloxane-polymerized scaffold hybrid structure obtained using a printable precursor composition comprising a polymerizable scaffold component (methacrylic acid) and a curable siloxane-containing component comprising a silanol-terminated PDMS and tetrapropyl orthosilicate (TPOS), wherein the silanol-terminated PDMS and the methacrylic acid were used at a ratio of 0.75 (PDMS:methacrylic acid), prior to processing to remove the polymerized scaffold (FIG. 8A) and after removing the polymerized scaffold to provide the printed polysiloxane-based object (FIG. 8B).
Figure 8B:
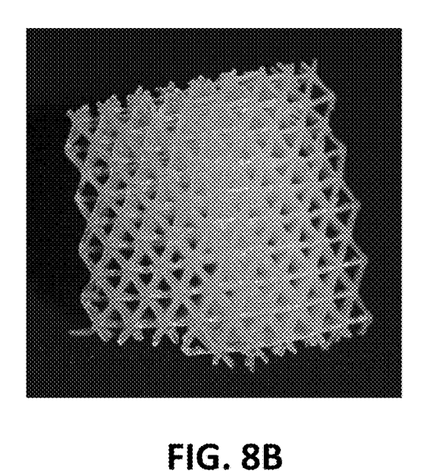
Figure 9:
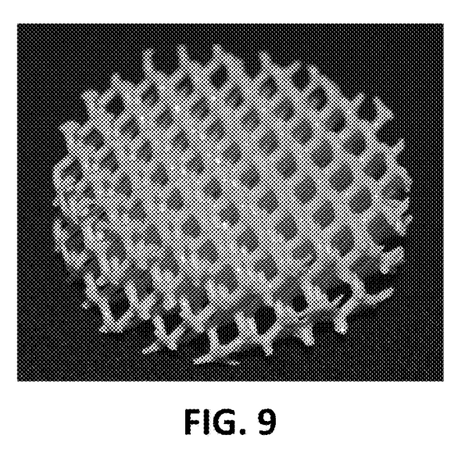
FIG. 9 is a photographic image of a cured polysiloxane-polymerized scaffold hybrid structure obtained using a printable precursor composition comprising a polymerizable scaffold component (methacrylic acid) and a curable siloxane-containing component comprising a silanol-terminated PDMS and TPOS, wherein the silanol-terminated PDMS and the methacrylic acid were used at a ratio of 1.5 (PDMS:methacrylic acid).
Figure 10:
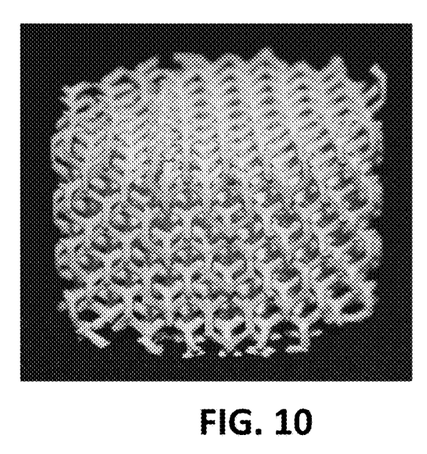
FIG. 10 is a photographic image of a cured polysiloxane-polymerized scaffold hybrid structure obtained using a printable precursor composition comprising a polymerizable scaffold component (methacrylic acid) and a curable siloxane-containing component comprising a silanol-terminated PDMS and TPOS, wherein the silanol-terminated PDMS and the methacrylic acid were used at a ratio of 0.25 (PDMS:methacrylic acid).

In this example, six different printable precursor compositions were evaluated to assess the ability to make silicone printed products using a range of mass ratios for the polymerizable scaffold component and the curable siloxane-containing component. The six different printable precursor compositions are described by Table 1, below. A silanol-terminated polydimethylsiloxane was used as the silicon-containing oligomer (namely PLY-7609, a silanol-terminated polydimethylsiloxane sold by NuSil®), along with tetrapropyl orthosilicate (TPOS), phenylbis(2,4,6-trimethylbenzoyl)phosphine oxide (as the initiator), and a dye solution comprising Sudan I in DMF (1.8 mg Sudan I in 30 μL DMF). All printable precursor compositions were successfully printed (see FIGS. 8A, 9, and 10) and provided pure polysiloxane-based objects (e.g., see FIG. 8B). In particular embodiments, a washing procedure was used after processing to provide the pure polysiloxane-based object, which included soaking the cured polysiloxane-polymerized scaffold hybrid structure in a solution of 200 proof ethanol while exposing it to UV light for 3 days at room temperature. For at least certain embodiments in this example, it was observed that embodiments having a higher mass ratio (that is, more of the curable siloxane-containing component) provided a more dense and stiff printed product. As such, modifying the mass ratio can provide a means of tuning the properties of the printed product.

TABLE 1

| Mass Ratio | Methacrylic Acid [g] | Silicon-Containing Oligomer [g] | Initiator [mg] | TPOS [μl] | Dye solution [μl] | Paraffin oil [ml] |
|---|---|---|---|---|---|---|
| 2 | 18.7 | 37.3 | 800 | 650 | 250 | 5 |
| 1.5 | 22.4 | 33.6 | 800 | 650 | 250 | 5 |
| 1 | 28.0 | 28.0 | 800 | 650 | 250 | 5 |
| 0.75 | 32.0 | 24.0 | 800 | 650 | 250 | 5 |
| 0.25 | 44.8 | 11.2 | 800 | 650 | 250 | 5 |
| 0.1 | 50.9 | 5.1 | 800 | 650 | 250 | 5 |

In view of the many possible embodiments to which the principles of the present disclosure may be applied, it should be recognized that the illustrated embodiments are only preferred examples and should not be taken as limiting the scope of the disclosure. Rather, the scope is defined by the following claims. We therefore claim as our invention all that comes within the scope and spirit of these claims.

We claim:

1. A printable precursor composition, comprising:
   a polymerizable scaffold component comprising acrylic acid, methacrylic acid, or a combination thereof; and
   a curable siloxane-containing component that is miscible with the polymerizable scaffold component;
   wherein the printable precursor composition is free of, or does not comprise, a metal contaminant.

2. The printable precursor composition of claim 1, wherein the curable siloxane-containing component comprises:
   a silicon-containing monomer or oligomer having a structure satisfying Formula I Formula I wherein each of $R^1$ and $R^2$ independently is selected from hydrogen, aliphatic, heteroaliphatic, haloaliphatic, haloheteroaliphatic, aromatic, or an organic functional group provided by any combination of such groups; each $R^3$ independently is hydrogen, aliphatic, heteroaliphatic, haloaliphatic, haloheteroaliphatic, aromatic, or an organic functional group provided by any combination of such groups; each $R^4$ independently is hydrogen, aliphatic, heteroaliphatic, haloaliphatic, haloheteroaliphatic, aromatic, or an organic functional group provided by any combination of such groups; n is an integer selected from 0 to 1,000,000; m is an integer selected from 1 to 1,000,000; and a silicon-based crosslinker having a structure satisfying Formula II

Formula II wherein each X independently is halogen or $OR^5$, wherein each $R^5$ independently is aliphatic, heteroaliphatic, haloaliphatic, haloheteroaliphatic, aromatic, or an organic functional group provided by any combination of such groups; and Y is $OR^5$, wherein each $R^5$ independently is aliphatic, heteroaliphatic, haloaliphatic, haloheteroaliphatic, aromatic, or an organic functional group provided by any combination of such groups; —O—Si(X')$_3$, wherein each X' independently is halogen or $OR^5$, wherein each $R^5$ independently is aliphatic, heteroaliphatic, haloaliphatic, haloheteroaliphatic, aromatic, or an organic functional group provided by any combination of such groups; or hydrogen, aliphatic, heteroaliphatic, haloaliphatic, haloheteroaliphatic, aromatic, or an organic functional group provided by any combination of such groups.

3. The printable precursor composition of claim 2, wherein the silicon-based crosslinker has a formula satisfying Formula IIA, Formula IIA wherein each of $R^6$, $R^7$, $R^8$, and $R^9$ independently is selected from aliphatic, heteroaliphatic, haloaliphatic, haloheteroaliphatic, aromatic, or an organic functional group provided by any combination of such groups.

4. The printable precursor composition of claim 3, wherein each of $R^1$, $R^2$, $R^3$, $R^4$, $R^6$, $R^7$, $R^8$, and $R^9$ independently is lower alkyl or phenyl.

5. The printable precursor composition of claim 3, wherein each of $R^1$, $R^2$, $R^3$, and $R^4$ independently is methyl and each of $R^6$, $R^7$, $R^8$, and $R^9$ independently is ethyl.

6. The printable precursor composition of claim 3, wherein each of $R^1$, $R^2$, $R^3$, and $R^4$ independently is ethyl or phenyl and each of $R^6$, $R^7$, $R^8$, and $R^9$ independently is methyl.

7. The printable precursor composition of claim 1, wherein the curable siloxane-containing component comprises polydimethylsiloxane, polydiethylsiloxane, polydiphenylsiloxane, or a combination thereof; and tetraethyl orthosilicate, tetrapropyl orthosilicate, or a combination thereof.

8. The printable precursor composition of claim 1, further comprising an initiator, a dye, a polymerization quenching compound, a solvent, or any combination thereof.

9. A printable precursor composition comprising:
acrylic acid, methacrylic acid, or a combination thereof;
polydimethylsiloxane, polydiethylsiloxane, polydiphenylsiloxane, or a combination thereof;
tetraethyl orthosilicate, tetrapropyl orthosilicate or a combination thereof;
an initiator; and
a dye; and
wherein the printable precursor composition is free of, or does not comprise, a metal contaminant.

10. A printed object formed from the printable precursor composition of claim 1, wherein the printed object comprises a cured structure having a polymeric backbone consisting of silicon-oxygen bonds formed from the curable siloxane-containing component.

11. The printed object of claim 10, wherein the cured structure consists of polydimethylsiloxane.

12. A method, comprising:
providing a printable precursor composition comprising a polymerizable scaffold component and a curable siloxane-containing component;
exposing the printable precursor composition to an energy source that provides sufficient energy to polymerize the polymerizable scaffold component thereby providing an intermediate structure comprising a polymerized scaffold and the curable siloxane-containing component;
exposing the intermediate structure to conditions sufficient to cure the curable siloxane-containing component to provide a cured polysiloxane-polymerized scaffold hybrid structure comprising a polysiloxane having a polymer backbone that consists of oxygen-silicon bonds; and
removing the polymerized scaffold from the cured polysiloxane-polymerized scaffold hybrid structure by exposing the cured polysiloxane-polymerized scaffold hybrid structure to a washing solution comprising water, an alcohol, or a combination thereof.

13. The method of claim 12, wherein removing the polymerized scaffold further comprises exposing the cured polysiloxane-polymerized scaffold hybrid structure and the washing solution to heat, irradiation, a hydroxide component, or a combination thereof.

14. The method of claim 12, wherein exposing the intermediate structure to conditions sufficient to cure the curable siloxane-containing component comprises heating the intermediate structure.

15. The method of claim 12, wherein the method is performed using a digital light processing printer.

16. The method of claim 12, wherein the printable precursor composition is free of, or does not comprise, a metal contaminant.

17. A method, comprising:
adding a printable precursor composition comprising (i) methacrylic acid or acrylic acid and (ii) a solution comprising polydimethylsiloxane, polydiphenylsiloxane, or a combination thereof; and tetraethyl orthosilicate, tetrapropyl orthosilicate, or a combination thereof to a digital light processing printer;
polymerizing the methacrylic acid or the acrylic acid using the digital light processing printer to provide an intermediate structure comprising a polymerized scaffold comprising polymetharylic acid or polyacrylic acid in physical association with the solution comprising the polydimethylsiloxane, the polydiphenylsiloxane, or both; and the tetraethyl orthosilicate, the tetrapropyl orthosilicate, or the combination thereof;
exposing the intermediate structure to a temperature ranging from ambient temperature to 100° C. to cure the polydimethylsiloxane, the polydiphenylsiloxane, or both; and the tetraethyl orthosilicate, the tetrapropyl orthosilicate, or both to provide a cured polysiloxane-polymerized scaffold hybrid structure comprising a polysiloxane having a polymer backbone that consists of oxygen-silicon bonds; and
removing the polymerized scaffold from the cured polysiloxane-polymerized scaffold hybrid structure by exposing the cured polysiloxane-polymerized scaffold hybrid structure to a washing solution.

18. A printed object formed from the printable precursor composition of claim 9, wherein the printed object comprises a cured structure having a polymeric backbone consisting of silicon-oxygen bonds formed from the curable siloxane-containing component.

19. The printed object of claim 18, wherein the cured structure consists of polydimethylsiloxane.

\* \* \* \* \*